UNITED STATES PATENT OFFICE.

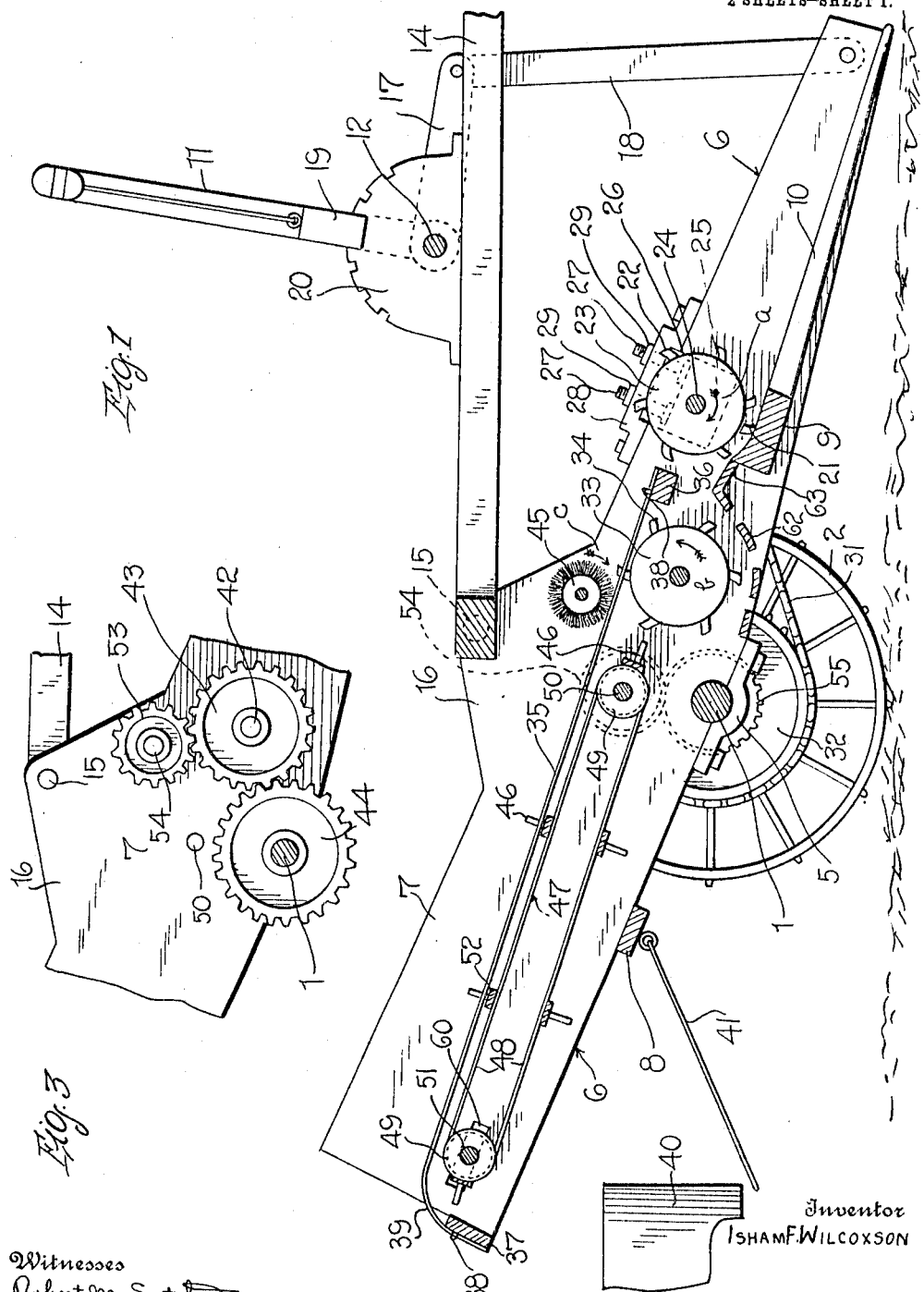

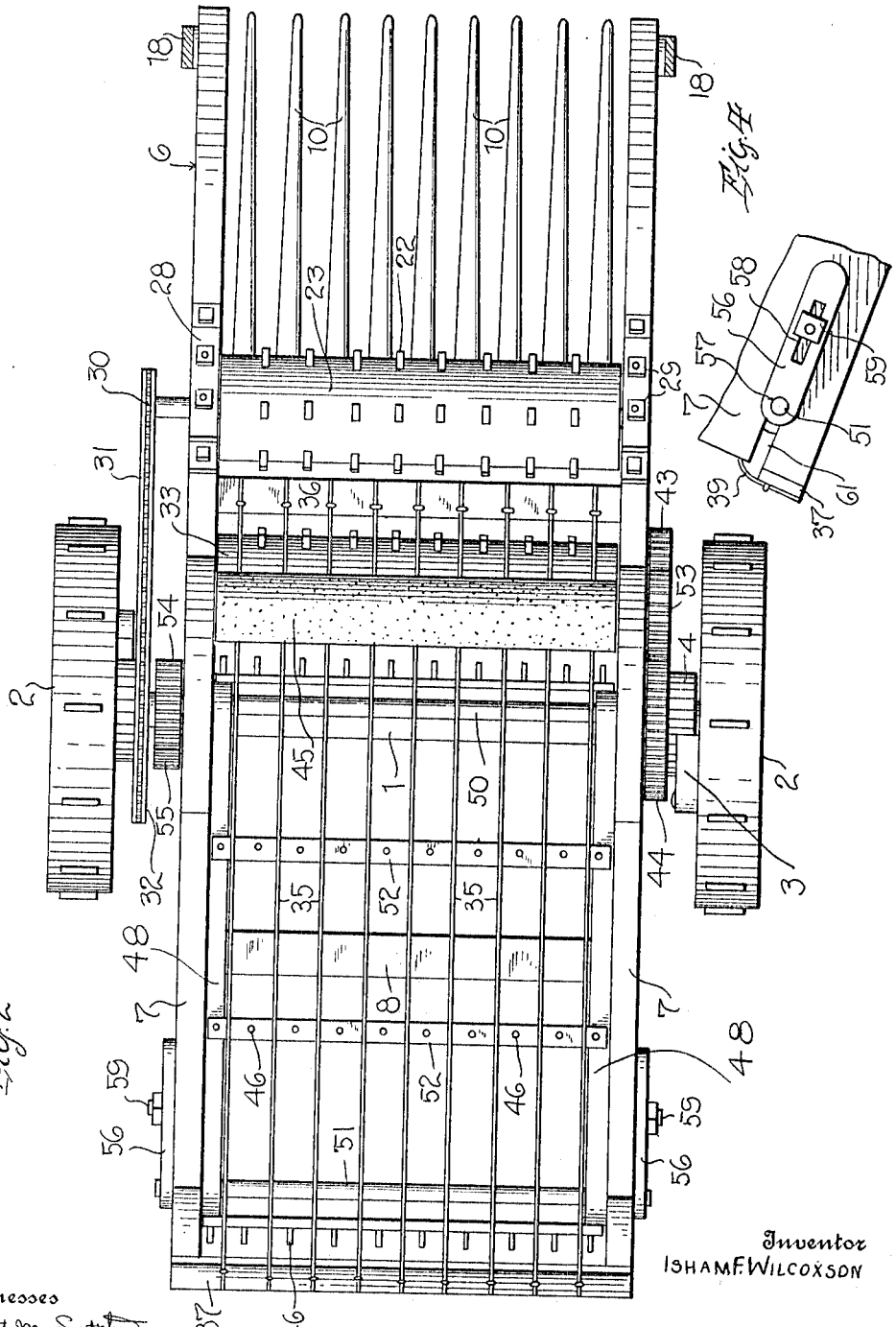

ISHAM F. WILCOXSON, OF DRYDEN, OKLAHOMA, ASSIGNOR OF ONE-HALF TO GEORGE W. METCALF, OF DRYDEN, OKLAHOMA.

HARVESTING-MACHINE.

1,106,018.   Specification of Letters Patent.   Patented Aug. 4, 1914.

Application filed September 15, 1913. Serial No. 789,910.

*To all whom it may concern:*

Be it known that I, ISHAM F. WILCOXSON, a citizen of the United States, residing at Dryden, in the county of Harmon and State of Oklahoma, have invented certain new and useful Improvements in Harvesting-Machines, of which the following is a specification, reference being had to the accompanying drawings.

This invention relates to certain improvements in harvesting machines and has relation more particularly to a device of this general character adapted to be employed in the gathering of cotton especially after the plants have been subject to frost and the stalks are denuded of all their foliage other than the pods, and the object of the invention is, in part, to provide a device of this general character having novel and improved means adapted to be drawn over the field containing the plants and to strip the same of the pods; and, in part, to provide novel and improved means whereby the pods after being gathered are operated upon to open the same.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a vertical sectional view taken centrally and longitudinally through a harvester constructed in accordance with my invention, with the barge herein shown as a receiving receptacle for the cotton being in fragmentary elevation; Fig. 2 is a top plan view of the device as disclosed in Fig. 1; Fig. 3 is a fragmentary sectional view illustrating certain details of the invention, as herein embodied; and Fig. 4 is a fragmentary view in elevation of the rear portion of the side of the machine opposite to that shown in Fig. 1 and illustrating a certain detail of the invention as disclosed.

As illustrated in the accompanying drawings, 1 denotes a supporting shaft having loosely mounted on its opposite extremities the traction wheels 2 which may be of any ordinary or preferred construction and provided with the pawls 3 adapted to coact with suitable ratchets 4 fixed to the shaft 1 whereby such shaft 1 will be caused to rotate upon the forward advance of the harvester. It is not believed necessary to give a further detail of the pawl and ratchet arrangement as this in itself is well known and in its details forms no particular feature of the present invention.

Pivotally supported, as at 5, upon the shaft 1 intermediate the wheels 2 is the frame 6 comprising the spaced parallel side members 7 formed of suitable material and of any desired configuration and having their rearwardly directed portions tied or united by the cross members 8 while the forward portions of such members 7 are tied or connected by the head 9 from which forwardly project the teeth or fingers 10. These fingers or teeth 10 are positioned adjacent the lower portion of the side member 7 and are disposed entirely across the space therebetween, such fingers or teeth being spaced one from the other but disposed in close proximity and are adapted to receive therebetween the stalks from which the pods are adapted to be gathered, it being thought obvious that upon the advance of the harvester that such pods will be readily and conveniently freed from the stalks.

As shown in Fig. 1 the device is in an inoperative position as in the operation of my improved harvester the fingers or teeth 10 are elevated above the ground so as to be drawn through the heads of the plants at a point below the pods. The position of the teeth or fingers 10 relative to the stalks is determined by the action of the lever 11 fixed upon the shaft 12 disposed transversely of the harvester and suitably supported by the draft rod or tongue 14 adjacent the rear end thereof, such rod or tongue 14 having its inner end portion in pivotal engagement, as at 15, with the side members 7. In order that the tongue or rod 14 may in no wise interfere with the movable parts of my harvester as herein set forth, I disclose the tongue 14 as in engagement with the upwardly directed portions 16 of the side member 7, and it is to be further observed that the pivotal engagement 15 of the tongue or rod 14 is substantially directly above the axle 1. The shaft 12 has extending from its opposite extremities the rock arms 17 to the outer or free end portion of each is pivotally engaged a link 18 which is in turn in pivotal engagement with the adjacent side member 7 at a point in close proximity to the forward end thereof whereby it will be readily observed that upon imparting movement to the lever 11 the side beams 7 will be caused to rock upon the shaft 1 in order to bring the forward end thereof to the requisite elevation, which adjustment is maintained by the latch 19 provided on the lever 11 coacting with the segmental rack 20 in a manner which is believed to be self-evident.

The head 9 is provided with a plurality of alined upwardly directed teeth 21 extending longitudinally thereof and between which are adapted to travel the teeth 22 projecting from the roller 23 mounted in the side member 7 above the head 9 and in close proximity thereto. In order to control the exact relative positions of the roller 23 and the head 9, I find it best to mount said roller 23 or more particularly the shaft 24 thereof in the vertically adjustable bearings 25 herein shown as blocks positioned in open ended slots 26 produced in the upper marginal portion of the side beam 7 and being under control of the endwise movable members 27 carried by the bearings 25 which extend loosely through the straps 28 bridging the open ends of the slots 26, such bearings 25 being maintained in their adjusted positions through the medium of the parts 29 herein shown as in threaded engagement with the projected portions of the members 27 and adapted to rest upon the upper surfaces of the straps 28.

One end portion of the shaft 24 is projected beyond the adjacent side member 7 and to such projected end portion is suitably affixed a sprocket 30 around which passes the sprocket chain 31 which in turn is directed around an enlarged sprocket 32 fixed to the shaft 1. Although not essential I have found it best in practice to have the adjacent ratchet 4 formed integral with the enlarged sprocket 32 although they can be separable if so desired.

As the forward advance of my improved harvester strips the stalks of their pods such pods will be forced back upon the head 9 and between such head 9 and the roller 23 and the rotation of this roller which is accomplished through the sprocket chain 31 inwardly or downwardly as indicated by the arrow a separates or hulls the pods especially through the coaction of the teeth or projections 21 and 22, hereinbefore referred to, and in order to facilitate this action it is to be observed that the face of the head 9 adjacent the roller 23 is concaved. To the rear of the roller 23 and positioned slightly therebelow is mounted in the side member 7 a second roller 33 adapted to rotate upwardly and forwardly as indicated by the arrow b, such roller 33 being also provided with teeth or projections 34 which are adapted to engage the separated or hulled pods and force the same between the spaced bars 35 extending from a point in close proximity to the rear of the roller 23 to the rear end of the side member 7. While this table may be constructed as desired I prefer to employ the cross beam 36 suitably secured to the side beams 7 at a predetermined point and the cross beam 37 secured to the rear ends of the side beams 7 and to such beams 36 and 37 the opposite extremities of the parallel bars 35 are suitably affixed as indicated at 38. The rear end portions of such bars 35 being downwardly curved, as at 39, to afford no obstruction to the discharge of the separated or hulled cotton into the desired container. While a bag or the like may be suitably suspended from the rear of my device to receive the separated or hulled cotton from the table before it is taken to the gin, I prefer to employ the usual barge, indicated in fragment as at 40, which is suitably connected with the cross brace 8 through the connection 41 whereby such barge 40 will be caused to trail behind my improved harvester and receive the separated or hulled cotton as it falls from the spaced rods 35. The roller 33 has one of its ends projected, as at 42, and to such projected end portion is suitably affixed the gear 43 adapted to mesh with a second gear 44 suitably affixed to the shaft 1 whereby it will be seen that upon the forward advance of my improved harvester that such wheel 33 will be caused to properly rotate.

Above the rods 35 and extending transversely of the harvester and suitably mounted in the side members 7 is the brush roller 45 adapted to be rotated in the direction, as indicated by the arrow c. This roller is positioned slightly to the rear of the axial center of the roller 33 and is adapted to brush the separated or hulled cotton projected upwardly between the bars 35 by the teeth 34 on the roller 33 rearwardly of such bars in order that such separated or hulled cotton may be engaged by the fingers 46 of the endless conveyer 47. The construction of this conveyer forms no essential feature of my invention in its details but as herein shown comprises the side belts 48 being connected by the transversely directed rods or bars 52 from which the fingers or teeth 46, hereinbefore referred to, project which fingers are of sufficient length to extend between and above the rods 35. The brush roller 45 is adapted to be rotated at a greater peripheral speed than the roller 33 and as herein disclosed the rotation of such roller 45 is accomplished through the medium of the gear 53 affixed to a projected end portion 54 of the shaft of such roller 45 which gear 53 is adapted to mesh with the gear 43 hereinbefore referred to, such gear 53 being of materially less diameter than the diameter of the gear 43 whereby the increased peripheral speed of the roller 45 is obtained. The conveyer 47 is driven from the shaft 50 which has affixed to a projected end portion a gear 54 in mesh with a gear 55 affixed to the shaft 1 at the side of the harvester opposite to that on which the gear 44 is affixed.

The shaft 50 is mounted in the side members 7 for axial movement only whereas the shaft 51 is capable of transverse movement relatively to the side beams 7 whereby the tension of the belts 48 may be controlled. As herein disclosed the shaft 51 is rotatably mounted in the bearings 56 capable of endwise adjustment. As herein disclosed the bearings 56 each comprises an elongated member having a suitable opening 57 adjacent to its outermost end through which the shaft 51 is adapted to project while the opposite end portion of such bearing 56 is provided with an elongated slot 58 through which the clamping means 59 is adapted to project, such clamping means being also directed through the adjacent side member 7. In order that no obstruction be offered by the side member 7 to the shaft 51 in its adjustment, such side members 7 are provided with the elongated openings 60 and 61, the opening 61 being in the nature of an open ended slot in order to facilitate the assemblage of the parts.

In order to prevent the separated or hulled pods from dropping to the ground between the rollers 23 and 33, I position below the roller 33 and in close proximity thereto the concaved member 62 herein shown as comprising a plurality of spaced slats or bars having their ends suitably affixed to the side member 7 and between the uppermost of such slats or bars 62 and the head 9, I interpose the rearwardly directed table 63. By having the concaved member 62 composed of the spaced slats or bars I afford a means whereby any of the burs of the pods after such pods have been separated or hulled that may become detached from the cotton through the action of the teeth 34 may drop to the ground.

From the foregoing description of my improvements, it is thought to be obvious that a harvester constructed in accordance with my invention is of an extremely simple and comparatively inexpensive nature and is particularly well adapted for use by reason of the convenience and facility with which it may strip the stalks of their pods and of the effective manner in which such pods are separated or hulled before being conveyed to the requisite container and it will also be obvious that my invention is susceptible of some change and modification without material departure from the principles and spirit of the invention and for this reason I do not wish to be understood as limiting myself to the precise arrangement and combination of the several parts herein shown in carrying out my invention in practice.

I claim:

1. A device of the character described including a frame, forwardly projecting teeth positioned at the forward portion of the frame, a toothed roller carried by the frame adjacent the inner ends of the teeth, a second toothed roller carried by the frame and positioned to the rear of the first named roller and in close proximity thereto, spaced rods extending rearwardly of the frame and above the second roller and between which the teeth of the second roller project, a brush roller mounted above the rods in close proximity to the second named roller, and means for rotating the rollers.

2. A device of the character described including a frame, forwardly projecting teeth positioned at the forward portion of the frame, a toothed roller carried by the frame adjacent the inner ends of the teeth, a second toothed roller carried by the frame and positioned to the rear of the first named roller and in close proximity thereto, spaced rods extending rearwardly of the frame and above the second roller and between which the teeth of the second roller project, a brush roller mounted above the rods in close proximity to the second named roller, means for rotating the rollers, and a conveyer positioned beneath the rods rearwardly of the second roller and provided with teeth projecting therebetween.

In testimony whereof I hereunto affix my signature in the presence of two witnesses.

ISHAM F. WILCOXSON.

Witnesses:
GEORGE W. METCALF,
W. E. LAWSON.